Sept. 8, 1959      H. F. PETERSON      2,902,917
DUCT AND LIGHTING ARRANGEMENT FOR VEHICLES
Filed July 14, 1955      4 Sheets-Sheet 1
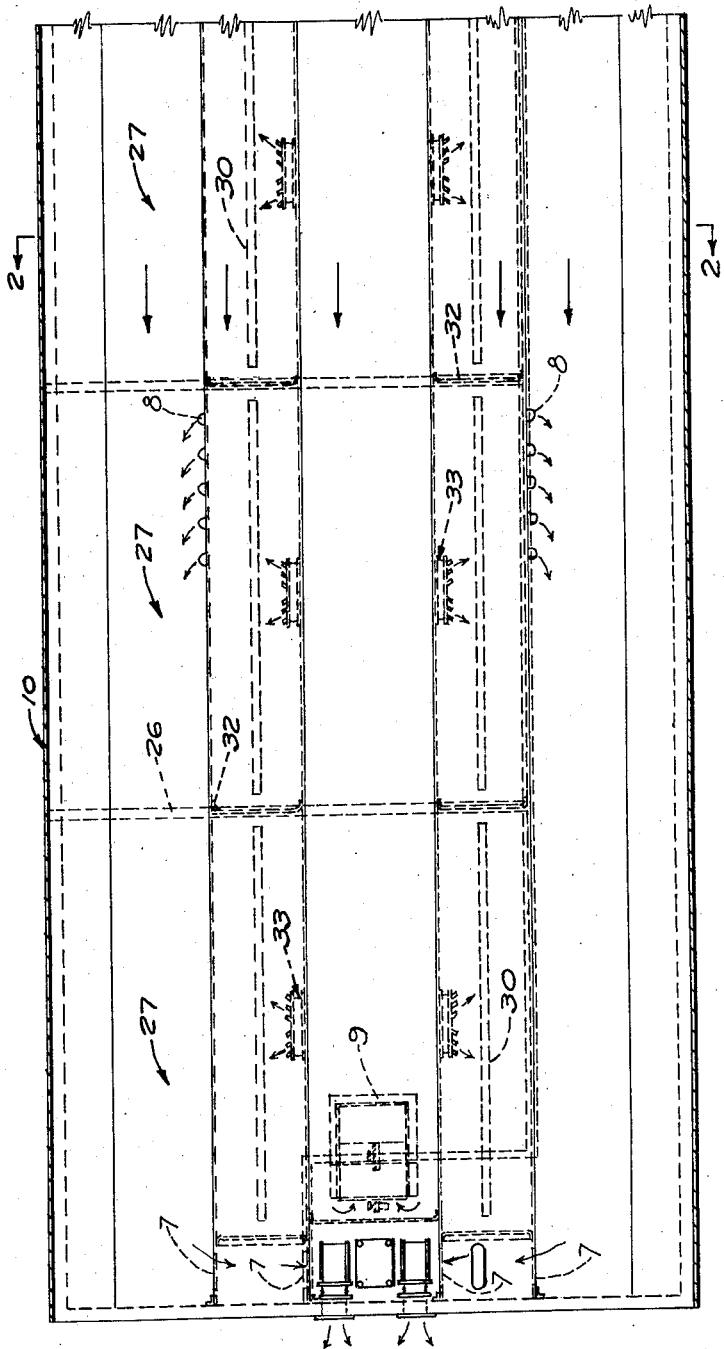
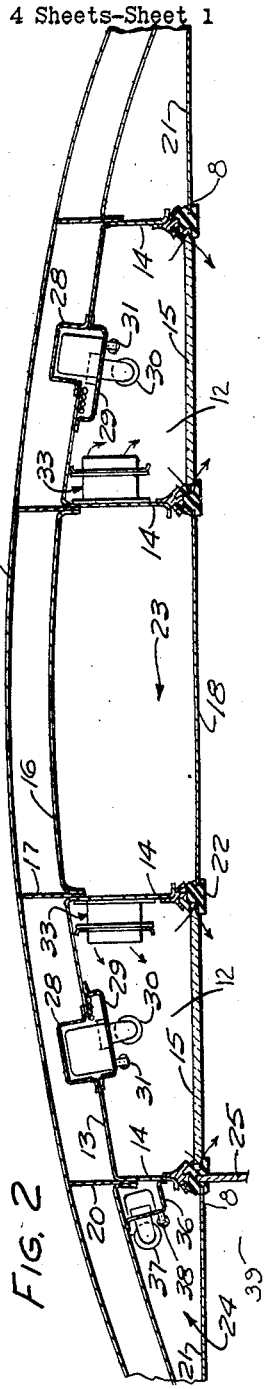
INVENTOR
HARTIN F. PETERSON
BY Wayne Morris Russell
ATTORNEY

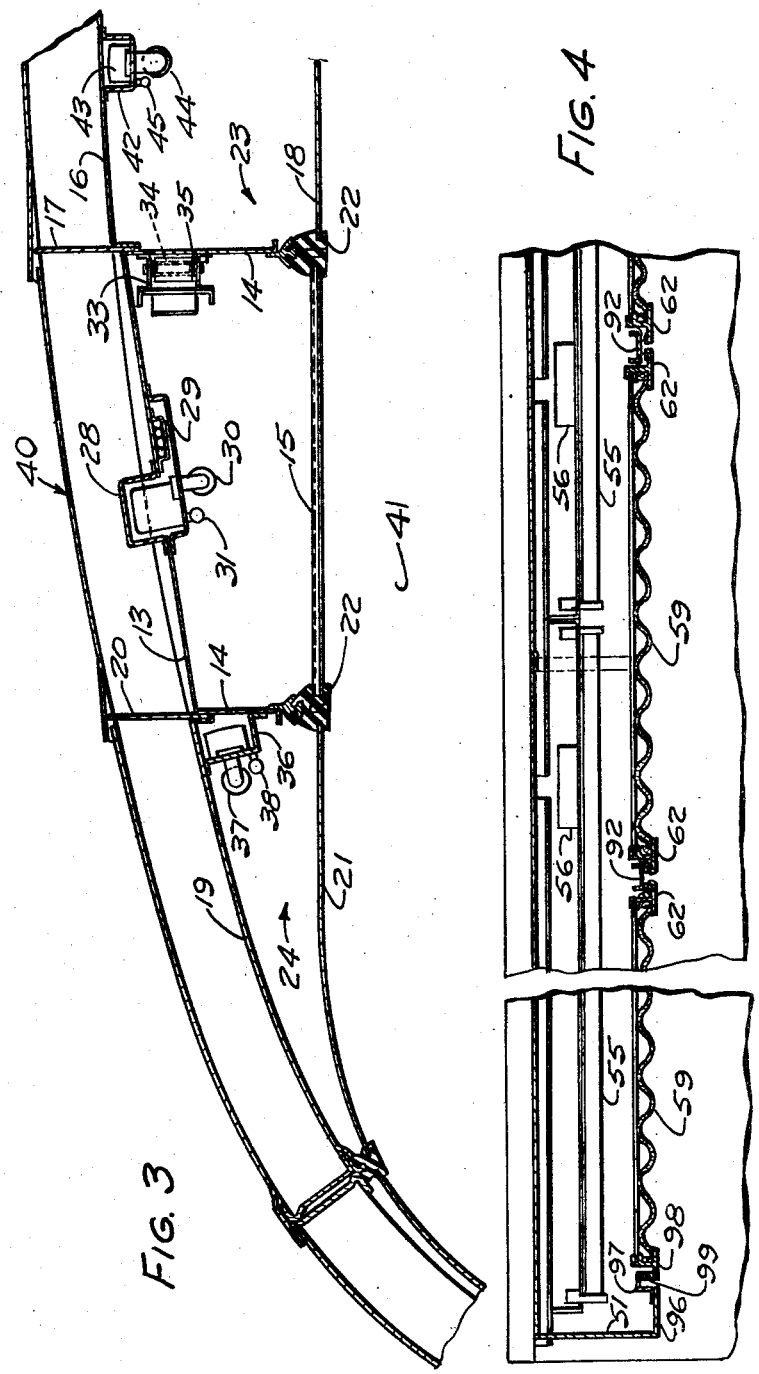
Sept. 8, 1959     H. F. PETERSON     2,902,917
DUCT AND LIGHTING ARRANGEMENT FOR VEHICLES
Filed July 14, 1955     4 Sheets-Sheet 2
INVENTOR
HARTIN F. PETERSON
BY Wayne Morris Russell
ATTORNEY Sept. 8, 1959  H. F. PETERSON  2,902,917
DUCT AND LIGHTING ARRANGEMENT FOR VEHICLES
Filed July 14, 1955  4 Sheets-Sheet 3

INVENTOR
HARTIN F. PETERSON
BY Wayne Morris Russell
ATTORNEY

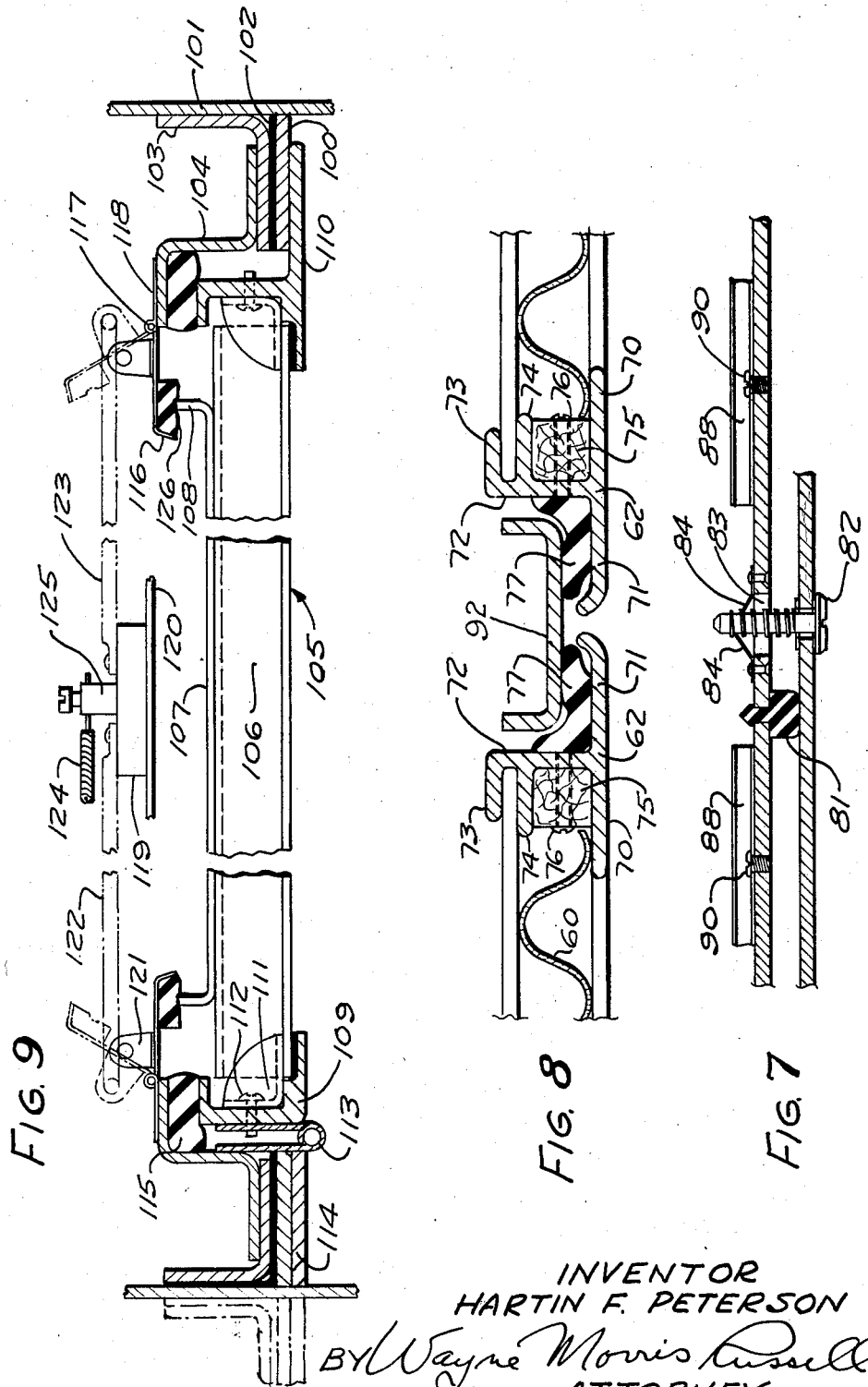

United States Patent Office 2,902,917
Patented Sept. 8, 1959

2,902,917

DUCT AND LIGHTING ARRANGEMENT FOR VEHICLES

Hartin F. Peterson, Chicago, Ill., assignor to Pullman-Standard Car Manufacturing Company, Chicago, Ill., a corporation of Delaware Application July 14, 1955, Serial No. 522,018

1 Claim. (Cl. 98—10)

This invention relates to passenger vehicles and is primarily concerned with a combination air duct and lighting and air diffusion arrangement for a railway passenger car.

The principal object of the invention is to provide an air duct for a passenger vehicle which is assembled prior to installation in the vehicle.

Another object of the invention is to provide a passenger vehicle having compartments and an overhead air duct with lighting therein penetrating through the duct into the compartments with means to prevent the light over one compartment from penetrating into the adjacent compartment.

Another object of the invention is to provide a plurality of ducts having bottom walls forming the ceiling of a passenger vehicle with lighting in the ducts penetrating through the bottom walls so that the entire ceiling across the width of the vehicle and substantially the full length of the vehicle is illuminated.

Another object of the invention is to provide a novel means of air diffusion from an air duct so as to reduce or eliminate drafts in a passenger vehicle.

Another object of the invention is to provide means for adjusting the flow of air from an air duct into a space occupied by a passenger in a passenger vehicle so that proper conditions in the space may be maintained.

The foregoing and other objects of the invention are attained by the arrangement and construction illustrated in the accompany drawings wherein:

Fig. 1 is a plan view of the end portion of a railway bedroom car;

Fig. 2 is a cross sectional view taken on the line 2—2 of Fig. 1;

Fig. 3 is a cross sectional view taken through approximately one half of a railway coach car;

Fig. 4 is a broken vertical longitudinal sectional view through the end portion of a railway coach car of the type having a combined air supply and distribution duct therein;

Fig. 7 is a sectional view taken on the line 7—7 of Fig. 5;

Fig. 8 is a cross sectional view showing the joint between the bottom walls of the air duct in Figs. 4 to 7 inclusive; and Fig. 9 is a fragmentary cross sectional view through an air duct for a bedroom car illustrating a modified form of damper arrangement for the duct.

Figure 6:
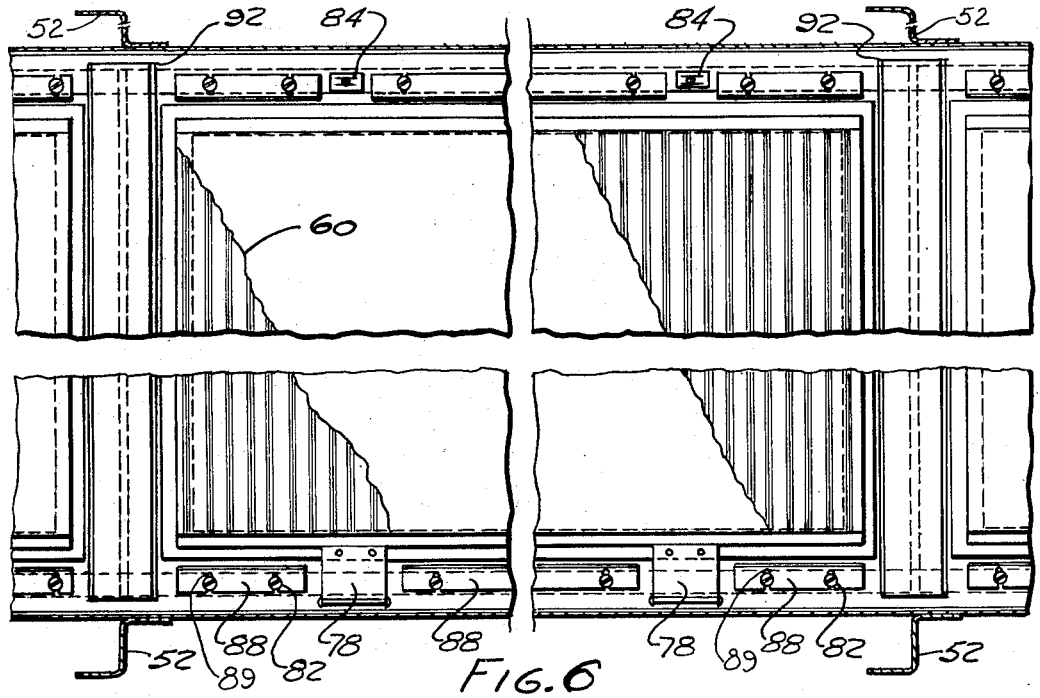
Fig. 6 is a cross sectional view taken on the line 6—6 of Fig. 5.

The invention proposes an air duct for a passenger vehicle which may be assembled prior to installation in the car. The invention also proposes for a passenger vehicle which is divided into compartments, a duct over the compartments with lights in the duct illuminating the compartment below each light, with means for preventing passage of light over one compartment into an adjacent compartment when the light in the latter compartment is turned off and the occupant has retired. A plurality of ducts are mounted at the roof of a passenger vehicle of the coach type and the bottom walls of the ducts form the ceiling of the vehicle. A light is mounted in each duct and illumination penetrates through the bottom wall so that the ceiling across the width of the car and substantially the full length of the car is illuminated. A combined air supply and air distribution duct is provided for a passenger vehicle of the coach type with novel air diffusion means for reducing or eliminating drafts in the passenger space. Novel means are also provided for controlling the amount of air flowing into a space or spaces occupied by passengers.

Referring to the drawings, a passenger vehicle in the form of a railway bedroom car 10 is shown in Figs. 1 and 2. The car 10 has the usual side walls and a roof 11 and two spaced air distribution ducts 12 extend longitudinally of the car. Each duct 12 is made up of a sloping top wall 13 and side walls 14 integral with the top wall and a removable bottom wall 15. A metal sheet 16 located centrally of the car 10 at the roof has downturned edges and vertical plates 17 are secured to the roof 11 and extend between the adjacent side wall 14 of the duct 12 and the adjacent downturned edge on the sheet 16 and a bottom wall 18 is spaced below the sheet 16. A metal sheet 19 has a downturned upper edge and vertical plates 20 are secured to the roof and extend between the downturned edge of the sheet and the adjacent side wall 12 of the adjacent duct 12. A light penetrable bottom wall 21 is spaced below the sheet 19 and rubber holders 22 support the bottom walls 15, 18, and 21. Each distribution duct 12 extends substantially the full length of the car. The sheet 16 and one side wall 14 of each duct 12 and the bottom wall 18 together form an air supply duct 23 extending substantially the full length of the car. The sheet 19 and bottom wall 21 and the adjacent side wall 14 of the adjacent duct 12 form an exhaust duct 24 at opposite sides of the ducts 12 and these exhaust ducts extend substantially the full length of the car. A vertical partition 25 spaced from one side wall of the car 10 extends substantially the full length of the car and fits in the adjacent rubber holder 22. A plurality of spaced vertical partitions 26 extend between the partition 25 and the other side wall of the car 10 to divide the car into a number of compartments or bedrooms 27.

A hat-shaped pressing 28 is secured to the top wall 13 of the duct 12 and a smaller hat-shaped pressing 29 is secured to the top wall and these two pressings form a box which contains ballast for the fluorescent lamp 30 mounted on the pressing 29 and a small night light 31 is also mounted on this pressing. There is one fluorescent light 30 in each duct 12 above each bedroom 27 and this light extends substantially the full length of the bedroom over which it is disposed as best shown in Fig. 1. A metal partition 32 is disposed directly above each partition 26 and is situated in each duct 12 and occupies the full inside cross sectional area of the duct and is air tight. An opening is provided in the side wall 14 of the duct 12 at the duct 23 and damper apparatus 33 is secured to the side wall and has opposed blades 34 and a bar 35 connects the blades together and a remote control cable is attached to the bar for moving the blades so that the supply of air from the duct 23 may be regulated by the occupant of the bedroom 27 directly below the particular damper apparatus 33. The bottom wall 15 of each duct 12 is made of translucent plastic panels and has corrugations extending its full width and is made up of a number of these panels and each panel extends the length of the bedroom 27 above which it is disposed. A bracket 36 is disposed in each exhaust duct 24 and is secured to the sheet 19 and adjacent side wall 14 of the adjacent duct 12 and a number of spaced fluorescent lights 37 are mounted on these brackets and a night light 38 is also mounted on each bracket. The bottom wall 21 of the exhaust duct 24 on the left hand side of Fig. 2 is made of translucent material so as to illuminate the passageway aisle 39. Air flows through the supply duct 23 in the direction indicated by the arrow in Fig. 1 and through each damper apparatus 33 into the particular section of the distribution duct 12. Since the panel 15 is corrugated the air will flow in the corrugations into the space between the adjacent side of the panel and the rubber holder 22 and out through the corrugations into the particular bedroom 27. The metal partitions 32 prevent the passage of light from one bedroom 27 into the adjacent bedroom when the lights 30 and 31 over said one bedroom are turned on and the lights over said adjacent bedroom are turned off. Thus if the occupant in one bedroom 27 has not retired the occupant in the adjacent bedroom will not be annoyed by the lights over said one bedroom. Each duct 12 may be assembled before installation in the car 10. That is the pressings 28 and 29 may be secured to top wall 13 and the lights 30 and 31 mounted on the pressing 29 and the damper apparatuses 33 secured to the particular side wall 14 and rubber holders 22 mounted on the walls 14 and the panels 15 placed in the rubber holders before installation in the car 10. The duct 12 could also be assembled in an alternative way, that is, pressings 28 and 29 secured to top wall 13 and lights 30 and 31 mounted on pressings 29 and damper apparatuses 33 secured to side wall 14 and rubber holders 22 placed on the side walls 14 and this much of the apparatus installed in the car 10 and then the panels 15 could be placed in holders 22 after the duct has been secured in the car. One side wall 14 of each duct 12 is secured to plates 20 and the downturned edge of sheet 19 and the other side wall of the duct is secured to the plates 17 and the adjacent downturned edge of the sheet 16.

A railway coach generally designated 40 is shown in Fig. 3. The arrangement is very similar to Figs. 1 and 2 and the same reference characters are used where the parts are similar. In Fig. 3 there are no partitions 32 in the ducts 12 and there is no partition 25 as in Figs. 1 and 2. A passenger space 41 is provided between the side walls and the ceiling of the car and the passengers occupy seats at each side wall. A bracket 42 is secured to the sheet 16 of the supply duct 23 and a box 43 containing ballast is secured on the bracket and a fluorescent light 44 is mounted on the bracket and a night light 45 is also mounted on the bracket. A number of lights 44 and 45 are arranged in spaced relation for the length of the duct 23. The car 40 also has lights 37 and 38 in both exhaust ducts 24. When the lights 37 and 38 in the exhaust ducts 24 and the lights 30 and 31 in the ducts 12 and the lights 44 and 45 in the duct 23 are all turned on the ceiling is illuminated across the entire width of the car and substantially the full length of the car. This provides the most modern lighting in coach type cars. The air distribution ducts are assembled prior to installation in the car in a manner like that explained for Figs. 1 and 2. The entire ceiling of the car giving off light provides superior illumination and there is a sense of spaciousness due to lighted ceilings and the ceiling does not have to be painted.

Figure 5:
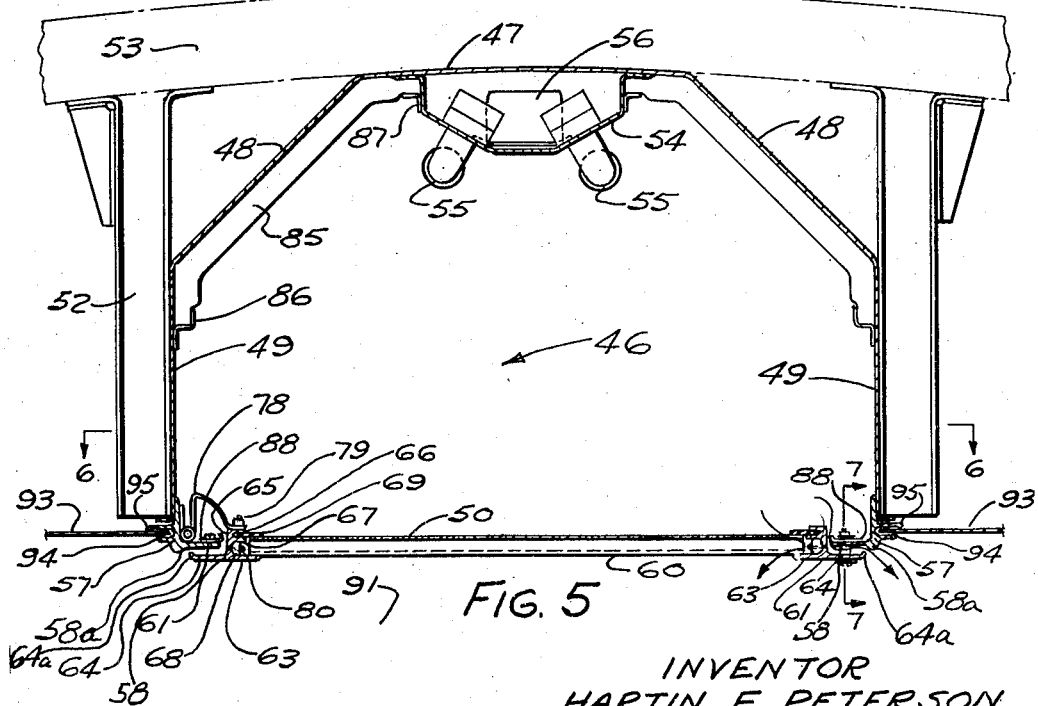
Fig. 5 is a cross sectional view through a portion of the car of Fig. 4 showing the air duct.

Referring to Figs. 4 to 8 inclusive there are shown portions of a railway coach and a duct 46 for the car. The duct 46 extends substantially the full length of the car and has a top wall made up of a flat central portion 47 and portions 48 are arranged at an angle with and integral with the portion 47. The duct 46 has side walls 49 integral with the portions 48 and a bottom wall 50 is hingedly mounted on the duct and the duct has an end wall 51 integral with the top wall. A vertical Z-member 52 is disposed at each side wall 49 of duct 46 and is secured to the adjacent side wall and the upper end of the member is secured to the roof 53 of the car. A number of brackets 54 are arranged end to end along the length of the car and are secured to the top wall of the duct 46. A pair of fluorescent lights 55 are mounted in each bracket 54 and these lights have substantially the same length as the bracket in which they are mounted and a box 56 containing ballast is mounted on each bracket. Framing members 57 extend the full length of the duct 46 and each member has a vertical arm secured to the inner face of the adjacent side wall 49 and a horizontal arm 58 extends toward the inside of the duct. Each bottom wall 50 is made up of a plurality of wall panels 59 arranged in end to end relation for substantially the full length of the duct 46. Each wall 59 is comprised of a translucent plastic panel 60 having corrugations extending its full width and framing members 61 disposed at each side of the panel have substantially the same length as the panel and framing members 62 are disposed at each end of the panel and have substantially the same width as the panel. Each framing member 61 is made up of two integral horizontal arms 63 and 64 and a vertical arm 65 is disposed between the horizontal arms and is integral with them. The vertical arm 65 has two integral spaced parallel portions 66 and 67 and a wood strip 68 having substantially the same length as the framing member 61 is disposed between portion 67 and the horizontal arm 63. A rubber strip 69 having substantially the same length as the framing member 61 is disposed between portions 66 and 67 and bears upon the top surface of the panel 60. Each framing member 62 has a horizontal arm 70 which supports the adjacent end of the panel 60 and has a horizontal arm 71 and a vertical arm 72 and parallel portions 73 and 74 integral with the vertical arm and a wood strip 75 is disposed between the arm 70 and the portion 74 and has substantially the same length as the framing member and is secured to the vertical arm by a number of spaced screws 76 and a rubber strip 77 has substantially the same length as the framing member and is secured to the arms 71 and 72 of the framing member. The framing members 61 and 62 are secured together by welding. A pair of hinges 78 are provided for each bottom wall 59 and then hinges are spaced apart and one leaf of the hinge is secured to the vertical arm of one of the framing members 57 and the other leaf is bent upwardly and has its free edge disposed on portion 66 of the adjacent framing member 61 and two spaced screws 79 extend through the rubber strip 69 and are in threaded engagement with the portions 66 and 67. Spaced screws 80 extend through the wood strip 68 and are in threaded engagement with the vertical arm 65 of the framing member 61. A number of spaced rubber bumpers 81 are mounted in the other framing member 57 and two spaced screws 82 each through the arm 64 of each bottom wall 59 and an opening 83 having a diameter considerably larger than that of the screw is provided in the arm 58 of the framing member and opposed spring arms 84 are riveted to the arm 58 and these spring arms engage the threads on each screw. Each bottom wall 59 may be swung downwardly about the hinges 78 by simply unscrewing the screws 82 and the spring arms 84 will gradually ride off the threads releasing the bottom wall. The hinged bottom walls 59 provide accessibility to the interior of the duct 46 so that the duct can be cleaned, the lights 55 serviced, and the acoustic panels 85 which have been provided to absorb sounds originating in the blower system and adjoining rooms may also be serviced. The acoustic panels 85 are supported by a Z-member 86 secured to the adjacent side wall 14 of the duct 46 and by angles 87 secured to the brackets 54. The duct 46 is both an air supply duct and an air distributing duct. Three plates 88 for each bottom wall 59 are disposed on the horizontal arm 58 of each framing member 57 and each plate has two spaced slots 89 extending transversely of the plate from the outer edge thereof. A screw 90 is disposed in each slot 89 and is in threaded engagement with the horizontal arm 58. Air in the duct 46 flows in the corrugations of panel 60 under the rubber strip 69 between the side of the panel and the wood strip 68 and between the arm 63 and the corrugations into the passenger space 91. Air also flows from the duct 46 between the horizontal arm 58 of framing member 57 and the vertical arm 65 of framing member 61 and between the arm 58 and arm 64 into the passenger space 91. The slots 89 and screws 90 slidably mount the plates 88 on the horizontal arms 58 of framing members 57 so that the plates may be moved toward and away from the vertical arms 65 of framing members 61 to control the amount of air flowing between arm 58 and arm 65 or to completely shut off the flow of air between arm 58 and arm 65. By having air flowing between arm 58 and arm 65 the velocity of air coming out of the duct 46 is reduced so as to eliminae drafts in the passenger space 91 and the plates 88 control the flow of air between arm 58 and arm 65 so that the velocity of air into the passenger space can be decreased or increased as desired. A horizontal member 92 in the form of a channel extends between and is secured to the framing members 57 and is disposed between the adjacent ends of the bottom walls 59. When the bottom wall 59 is swung up to a horizontal position the rubber strips 77 engage the channel 92 so that air cannot flow out of the duct 46 between the ends of the bottom walls into the passenger space 91 and the rubber strips 77 and rubber bumpers 81 also prevent noise when closing the duct 46. Ceiling plates 93 extend from between portions 94 and 95 on framing members 57 to the side walls of the car. The end wall 51 of duct 46 has an extension 96 and a Z-member 97 extending substantially the full width of the duct is secured on the extension and the endmost bottom wall 59 has a T-member 98 extending substantially the full width of the bottom wall and a rubber strip 99 extending substantially the full width of the bottom wall is secured to the member 98. The duct 46 is assembled prior to installation in the car, that is, brackets 54 and lights 55 are secured to the top wall of the duct and angles 86 and 87 are secured to the top and side walls respectively of the duct and acoustic panels 85 placed between the angles and bottom walls 59 are mounted on the duct and then the duct is installed in the car by securing side walls 49 to the members 52.

Referring to Fig. 9 a modified form of damper arrangement is shown. The duct in Fig. 9 is for use in a bedroom car and is an air distribution duct. If the duct of Fig. 9 were installed in a bedroom car there would be two such ducts spaced apart like the air distribution ducts of Figs. 1 and 2, there would be partitions 32 in the ducts as in Figs. 1 and 2 and there would be a supply duct 23 as in Figs. 1 and 2 and there would be two exhaust ducts 24 as in Figs. 1 and 2. A flat plate 100 extends substantially the full length of the duct and is secured to the side walls 101 of the duct and material 102 is disposed on the plate and an angle 103 extends substantially the full length of the duct. A Z-member 104 extends substantially the full length of the duct and is secured to the angle 103. A bottom wall 105 is comprised of a translucent plastic panel 106, a clear plastic panel 107 having a lesser width than the panel 106 and having its sides spaced from the sides of the panel 106, and vertical stops 108 are integral with the panel 107. The panel 106 has one side supported on a framing member 109 and has its other side supported on a framing member 110 and spaced clips 111 are disposed between corrugations of the panel 106 and are secured to the framing members by screws 12. A pair of spaced hinges 113 each have one leaf secured to member 104 and plate 100 and plate 114 which is secured to the side wall 101 of the duct and the other leaf of the hinge is secured to framing member 109 by the screw 112 being in threaded engagement with the leaf. Rubber strips 115 are secured to members 104 and dampers 116 each have one side hingedly connected to the respective member by hinge pin 117 and hinge leaf 118 which is secured to the member. A circular plate 119 is pivoted at its center on a plate 120 extending between and secured to the side walls of the duct. A part 121 is secured to each damper 116 and a link 122 has one end pivoted to the respective part 121 and has its other end pivoted to plate 119 on one side of its center. Another link 23 has one end pivoted to the respective part 121 and has its other end pivoted to the plate 19 on the other side of its center. A remote control cable 124 is connected to a post 125 secured to plate 119 at a location spaced from its center. There are a plurality of bottom walls 105 arranged end to end in the duct and the framing members 109 and 110 and stops 108 and dampers 116 are of substantially the same length as the bottom wall 105. When the dampers 16 are open air flows between strip 115 and stop 108 through the corrugations in panel 106 and between the framing member 109 and the side of the panel and along the corrugations into the bedroom below the particular bottom wall 105. When it is desired to partially close the dampers 116 or to fully close the dampers to prevent the flow of air from the duct into the bedroom below the remote control cable 124 which leads to the bedroom is pulled by the occupant of the bedroom to pivot the dampers 116 toward stops 108 and when the rubber strips 126 secured to the dampers come into contact with the stops air in the duct cannot flow into the bedroom. The strips 126 have substantially the same length as the dampers 116.

In Figs. 1 and 2 a pressure regulator valve 9 is provided. If any of the dampers 33 are closed, the air that would have gone through these dampers goes out through the valve 9 and into the passageway, through the passageway to the other end of the car where it is recirculated.

In Figs. 1 and 2 spaced holes 8 are provided in the bottom wall 21 of each exhaust duct 24. Air in the bedrooms 27 or in the car passageway to be exhausted moves through the holes 8 into the respective exhaust ducts 24 and is exhausted through holes 7 to the outside of the car.

In Figs. 4 to 8 inclusive each framing member 61 has a lip 64a on its arm 64 having the same length as the arm, and each framing member 57 has a rib 58a having the same length as the framing member. When air flows through the adjacent passage the lip 64a causes a turbulence which gives better mixing of the air, and the rib 58a directs the air downwardly to give better air diffusion and the air is directed away from the adjacent portion of the ceiling to prevent streaking of the ceiling with dust. The portions 47, 48, and side walls 49 of duct 46 are coated with light reflective enamel. The portions 48 of duct 46 assist in light reflection and also stiffen the duct.

Dining cars and lounge cars would have the same ceiling and duct arrangement as the coach type car illustrated in Fig. 3 and therefore they could have their ceilings completely illuminated.

From the foregoing it will be seen that there has been provided an air duct for passenger vehicles which may be assembled prior to installation in the vehicles, means to eliminate passage of light from one compartment to the adjacent compartment of a compartment passenger vehicle, means for illuminating the entire ceiling of passenger coach vehicles, means for diffusing air into a space where it will come into contact with passengers, and means for adjusting the air flow into a space occupied by passengers.

What is claimed is:

In a passenger vehicle, an air duct having a top wall and a pair of spaced side walls secured to the top wall and a bottom wall comprising a panel having corrugations extending transversely thereof to the sides and another panel disposed upon the first named panel and secured thereto and having a lesser width than the first named panel and having its side spaced from the sides thereof, vertical stops secured to the respectively opposite sides of the second named panel, angled section side edge framing members at the respective sides of the first named panel each having a horizontal arm secured to the bottom of the first named panel and an upstanding vertical arm spaced from the adjacent side of the panel, duct framing members extending longitudinally of said duct and secured respectively to the side walls thereof and supporting connections with said side edge framing members, said respective vertical stop and said vertical arm of the adjacent duct framing member being spaced apart to define an air discharge outlet therebetween, and dampers disposed in the duct and extending longitudinally thereof and each having one side pivotally mounted on the adjacent duct framing member on the side wall adapted to control the discharge outlet between said stop and vertical arm, and means for operating the dampers simultaneously.

References Cited in the file of this patent
UNITED STATES PATENTS

| | | |
|---|---|---|
| 2,150,449 | Madden | Mar. 14, 1939 |
| 2,383,523 | Steins | Aug. 21, 1945 |
| 2,424,828 | Keep | July 29, 1947 |
| 2,640,410 | Raider et al. | June 2, 1953 |
| 2,673,512 | Henney | Mar. 30, 1954 |
| 2,698,569 | Reynolds et al. | Jan. 4, 1955 |
| 2,730,942 | Peterson | Jan. 17, 1956 |